United States Patent [19]
Noguchi et al.

[11] Patent Number: 5,309,423
[45] Date of Patent: May 3, 1994

[54] MAGNETO-OPTICAL REPRODUCING DEVICE WITH OPTICAL SYSTEM HAVING TWO REFLECTIVE ELEMENTS AND PROVIDING PHASE DIFFERENCE CANCELLATION

[75] Inventors: Masato Noguchi; Isao Okuda; Suguru Takishima, all of Tokyo, Japan

[73] Assignee: Asahi Kogaku Kogyo Kabushiki Kaisha, Tokyo, Japan

[21] Appl. No.: 929,535

[22] Filed: Aug. 14, 1992

[30] Foreign Application Priority Data

Aug. 14, 1991 [JP] Japan .................. 3-204228

[51] Int. Cl.$^5$ .............................................. G11B 7/00
[52] U.S. Cl. .................................. 369/110; 369/13; 369/288; 360/114
[58] Field of Search .................. 369/110, 13, 288; 360/114

[56] References Cited
U.S. PATENT DOCUMENTS

| | | | |
|---|---|---|---|
| 4,553,229 | 11/1985 | Wakamiya | 369/110 |
| 4,573,149 | 2/1986 | Deguchi et al. | 369/13 |
| 5,085,496 | 2/1992 | Yoshida et al. | 369/110 |
| 5,119,352 | 6/1992 | Bell, Jr. | 369/13 |
| 5,124,868 | 6/1992 | Matsubayashi et al. | 369/13 |
| 5,202,860 | 4/1993 | Takahashi et al. | 369/13 |

FOREIGN PATENT DOCUMENTS 1-176348  7/1989  Japan .

*Primary Examiner*—Paul M. Dzierzynski
*Assistant Examiner*—Kim-Kwok Chu
*Attorney, Agent, or Firm*—Sandler, Greenblum & Bernstein

[57] ABSTRACT

A reflected light beam from a magneto-optic disk is reflected by a first and second reflective element toward a signal detecting system. The first reflective element reflects the reflected light from the magneto-optic disk and gives a phase difference into the light beam. The second reflective element reflects the reflected light by the first reflective element toward the signal detecting system, and gives a phase difference which has the same amount as the phase difference caused by the first reflective element, but with the inverse sign thereof.

6 Claims, 4 Drawing Sheets

MAGNETO-OPTICAL REPRODUCING DEVICE WITH OPTICAL SYSTEM HAVING TWO REFLECTIVE ELEMENTS AND PROVIDING PHASE DIFFERENCE CANCELLATION

BACKGROUND OF THE INVENTION

1. Field of the Invention

The present invention relates to an optical system of a magneto-optical disk apparatus which reads a signal from an optical magnetic disk using polarized light.

2. Description of the Prior Art

In optical systems that use magneto-optical disk devices, a signal is read by detecting a slight rotation in the direction of polarization as a change of optical intensity due to the magneto-optic Kerr effect when a laser beam is reflected from the disk surface. The laser beam which is used is a linearly polarized beam for which a change in the direction of polarization is easiest to detect.

On the other hand, since a general optical element such as a mirror or a half mirror has a phase difference which is generated between a P polarized component and a S polarized component, the optical element changes the polarized condition of laser light. If such an optical element is used for the optical system of the magneto-optical disk apparatus which detects slight rotation of a polarized surface, the polarized condition of reflected laser light changes and a wrong signal be read from a disk.

In order to prevent this error, a non-phase difference coating, which cuts down the phase difference between the incident light and the reflected light of a polarized light, is given to optical elements such as a mirror and/or a half mirror used in the optical system of a conventional magneto-optical disk apparatus.

However, the cost of a non-phase difference coating given to the optical element is high, since the number of layers of a coating is large.

SUMMARY OF THE INVENTION

The present invention has been accomplished in view of the above problem. It is therefore the object of the invention to provide an magneto-optical disk apparatus that is capable of reducing the number of optical elements to which a non-phase difference coating is given.

The present invention is characterized in that the apparatus is provided with a signal detecting system for detecting recorded signal of a magneto-optical disk based on the polarized condition of reflected light from the magneto-optical disk, a first reflective element for reflecting the light reflected from the magneto-optical disk and causing a phase difference in the respective polarized components of the light, a second reflective element for reflecting the light reflected by the first reflective element toward the signal detecting system and causing a phase difference of the same magnitude as the phase difference caused by the first reflective element and inverse sign thereof.

The reflected light beam from the magneto-optical disk is incident into the signal detecting system through at least one pair of the first and the second reflective elements, with the incident plane of the first reflective element being perpendicular to the incident plane of the second reflective element. An incident plane is defined as a plane which includes a normal and an incident ray. A sign of the phase difference is defined as which polarized component is ahead of the other.

DETAILED DESCRIPTION OF THE EMBODIMENTS

The embodiment of present invention will now be described hereinafter with reference to the drawings. The present disclosure relates to subject matter contained in Japanese patent application No. H3-204228 (filed on Aug. 14, 1991) which is expressly incorporated herein by reference in its entirety.

EMBODIMENT 1

Figure 1:
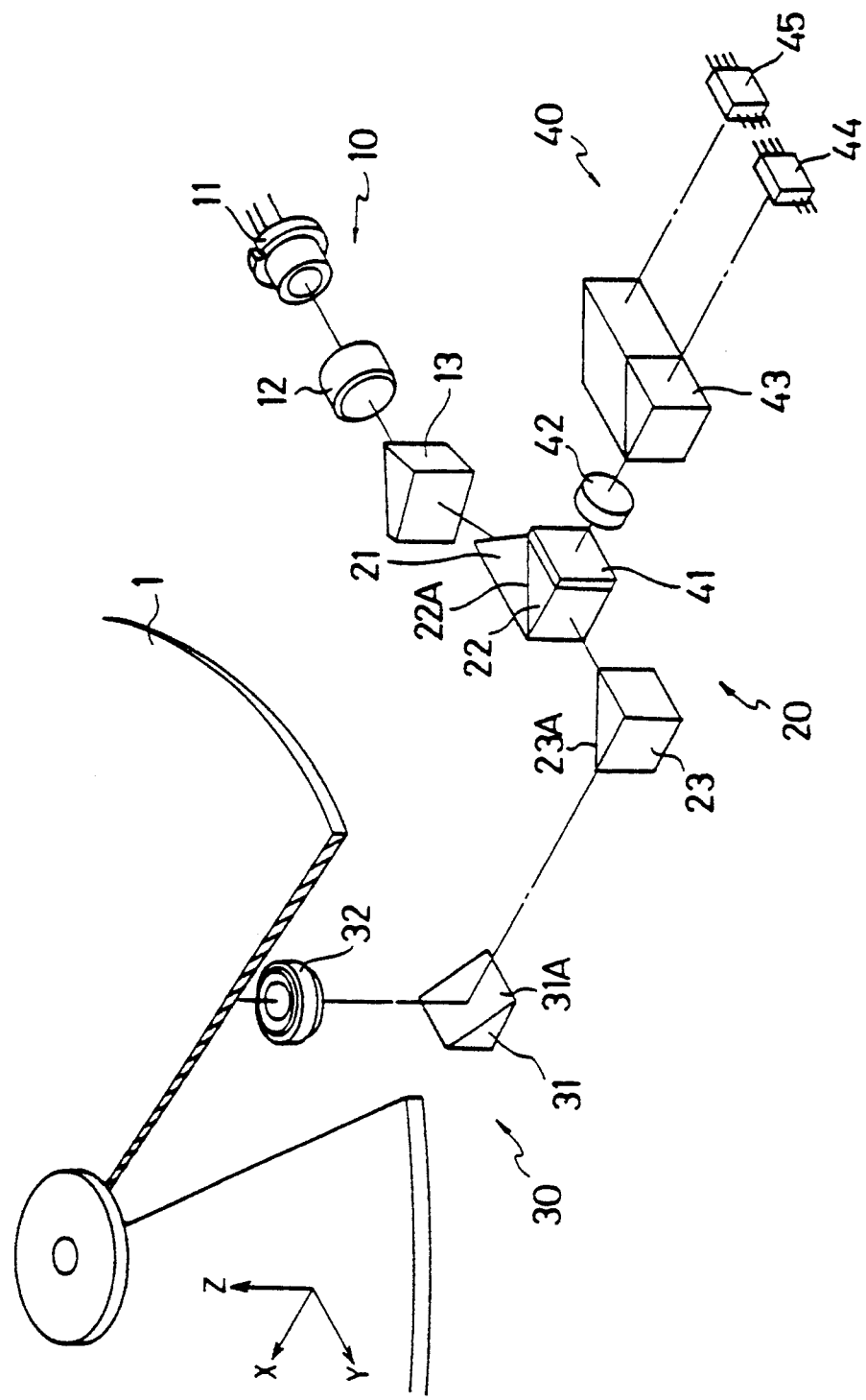
FIG. 1 is a diagram of a magneto-optic-disk-apparatus optical system of an embodiment 1 according to the present invention.

FIG. 1 shows embodiment 1 of the optical system of such a magneto-optical disk apparatus according to the present invention. The optical system of this magneto-optical disk apparatus has a light source portion 10, a prism block 20, an objective optical system 30 and a signal detection system 40.

The light source portion 10 is composed of a semiconductor laser 11 for generating divergent light beam, a collimator lens 12 for collimating the divergent light beam, and an anamorphic prism 13 for shaping the sectional form of the light beam.

The prism block 20 is composed of an anamorphic prism 21 for shaping the sectional form of the light beam from the anamorphic prism 13, a triangular prism 22 which is cemented to the anamorphic prism 21, and a prism 23. The anamorphic prisms 13 and 21 shape the light beam into a circular cross-section. The cemented surface between the anamorphic prism 21 and the triangular prism 22 is a half mirror surface 22A, which is covered with non-phase difference coating.

The objective optical system 30 has a prism 31, and an objective lens 32 for converging a light beam onto the magneto-optical disk 1.

The prism 31 reflects the polarized light from prism 23 toward the objective lens 32, and reflects the reflected light beam from the magneto-optical disk 1 toward the prism 23. Furthermore, the incident plane of the reflective surface of the prism 31 is perpendicular to the incident plane of the reflective surface of the prism 23. An incident plane is defined as a plane which includes a normal and an incident ray.

In the embodiment 1, the prism 31 is the first reflective element, and the prism 23 is the second reflective element. The reflective surface 23A and the reflective surface 31A are covered with the same coating.

In order to obtain the same coatings on the reflective surface 23A and the reflective surface 31A, it is desirable not only to make the design value of a thickness of a film layer the same, but also to coat them concurrently by the same evaporation device. Thereby, the same coating can be obtained, even if an error occurs in the thickness of a film layer at the time of an evaporation.

The objective lens 32 and the prism 31 are disposed within a head (not shown) that is slidable in the radial direction X of the magneto-optical disk 1. Also, the objective lens 32 is mounted on an actuator that is disposed within the head and can be finely moved in the optical axis direction and the radial direction.

The signal detection system 40 is composed of a halfwave plate 41 which rotates the polarizing direction of the light beam by 45 degrees, a condensing lens 42 for condensing the light beam reflected by the half mirror surface 22A through the halfwave plate 41, a polarizing beam splitter 43 which separates the light beam into P and S polarized components and photodetectors 44 and 45 for detecting the P and the S polarized components, respectively.

Next, an action of the embodiment 1 will be explained.

The polarized light emitted from the light source portion 10 is incident into the magneto-optical disk 1 through the prism block 20 and the objective optical system 30. Since the light beam emitted from the semiconductor laser 11 is linearly polarized light, phase difference does not occur in the light beam, when the light beam is reflected by the prisms 23 and 31.

Through the objective lens 32, the reflected light beam from the magneto-optical disk 1, of which the polarized condition of which is changed by the magneto-optical disk 1 is reflected by the prism 31.

When the light beam is reflected by the prism 31, a phase difference α is given to a S polarized component of the light beam with respect to a P polarized component.

By the way, the polarized components are defined with respect to an incident plane of the reflective surface. Thus, a P polarized component is defined as having electric vibration that is parallel to an incident plane, and S polarized component is defined as having an electric vibration that is perpendicular to an incident plane.

Since the incident plane of the prism 31 is perpendicular to the incident plane of the prism 23, the S polarized component to the prism 31 is a P polarized component to the prism 23, and the P polarized component to the prism 31 is a S polarized component to the prism 23.

Therefore, when the light beam is incident to the prism 23, the P polarized component has phase difference α with respect to the S polarized component. Also, when the light beam is reflected by the prism 23, phase difference α is given to an S polarized component of the light beam with respect to a P polarized component. In other words, phase difference −α, which has inverse sign, is given to a P polarized component against an S polarized component.

Therefore, the phase difference caused by the prism 31 is canceled by the phase difference caused by the prism 23.

The reflective light beam of which the phase difference was canceled is reflected by half mirror surface 22A, and is rotated in its polarization direction by 45 degrees through the halfwave plate 41. The light beam passing through the halfwave plate 41 is condensed by the condensing lens 42. A P polarized component passes through the polarizing beam splitter 43 onto a first a photodetector 44. A S polarized component is reflected by the polarizing beam splitter 43 onto an second photodetector 45.

A polarizing direction of the beam reflected by the magneto-optic disk 1 rotates by Kerr effects according to a magnetized direction of the spot point of the magneto-optical disk. Since the polarizing direction is rotated by 45 degrees by the halfwave plate 41 and each polarizing component is detected by the independent photodetector, it is possible to detect the recorded signal, based on the difference between the output signals from the photodetectors 44 and 45.

In the prior art, non-phase difference coatings are required for the prisms 23 and 31. However, in the embodiment 1, the non-phase difference coatings are not required for the prisms 23 and 31.

Figure 2:
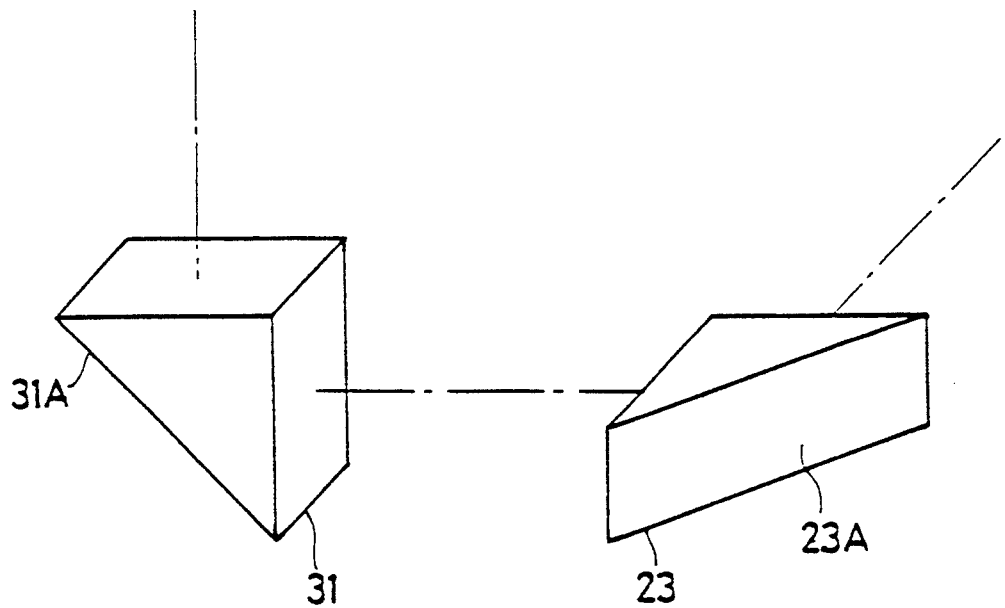
FIG. 2 is a drawing in which another arrangement of the prisms of embodiment 1 is shown.

Moreover, in the above mentioned embodiment, the prisms 23 and 31 are arranged so as to reflect light beam by outer surfaces thereof. It is possible to arrange the prisms so as to reflect light beam by inner surface as shown in FIG. 2. If the prisms are arranged as is shown in FIG. 2, coating to each prism is not necessary.

Although one pair of prisms is used in embodiment 1, two or more pairs of prisms which cancel a phase difference to each other can be used.

EMBODIMENT 2

Figure 3:
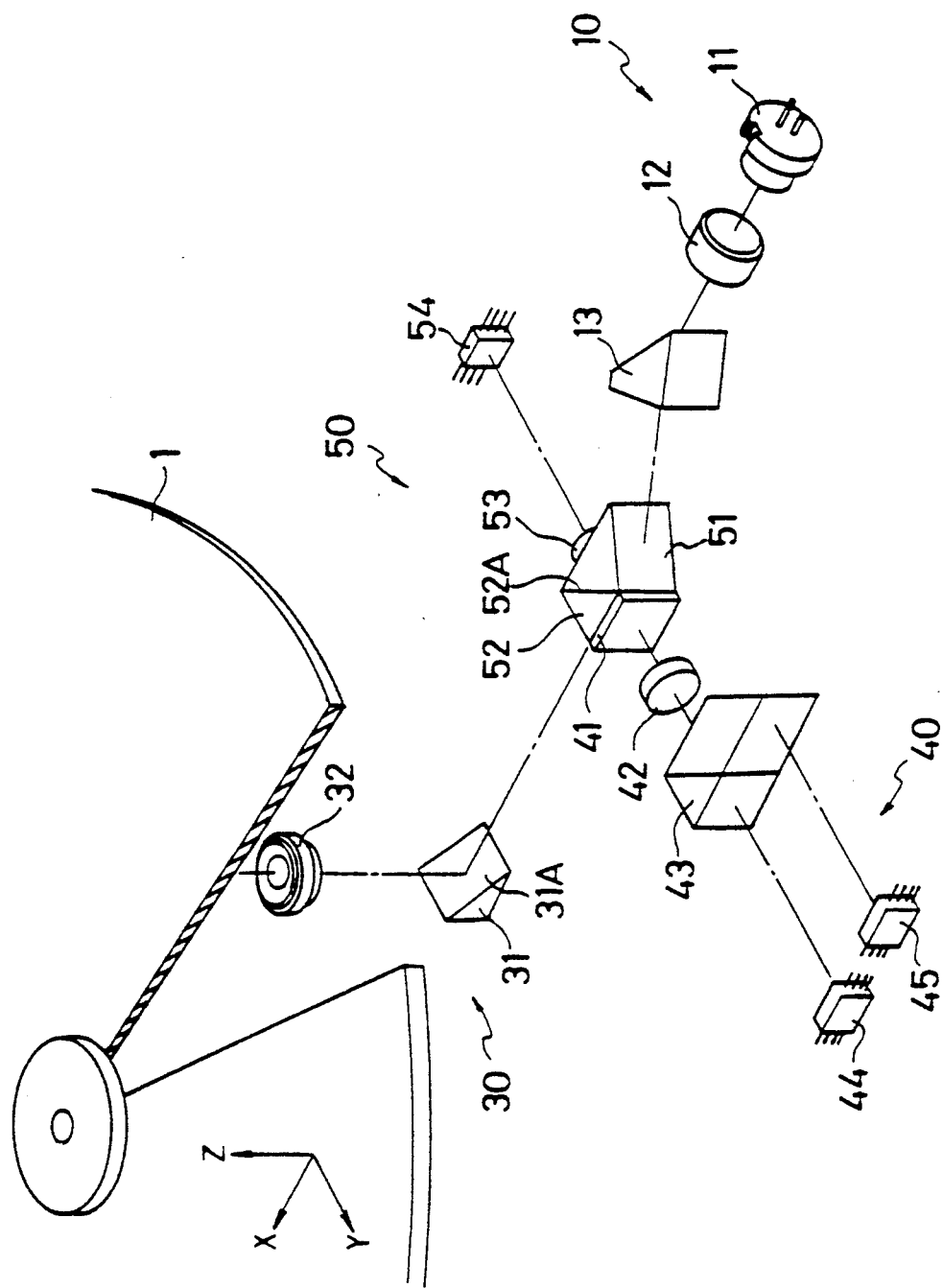
FIG. 3 is a diagram of a magneto-optic disk apparatus optical system of embodiment 2 according to the present invention.

FIG. 3 shows embodiment 2 of the optical system of a magneto-optic disk apparatus of the present invention. The optical system of this magneto-optical disk apparatus has a light source portion 10, a prism block 50, an objective optical system 30 and a signal detection system 40. In FIG. 3, the same reference number is given to the same part as FIG. 1, and descriptions of these parts are omitted.

The prism block 50 has anamorphic prism 51, right-angled prism 52 and a condensing lens 53. The cemented surface between the prisms 51 and 52 is a half mirror surface 52A.

Part of the light beam emitted from the light source portion 10 is reflected by the half mirror surface 52A is condensed by the condensing lens 53 and is incident onto an APC (automatic power control) sensor 54. The output signal of the APC sensor is used for automatic output adjustment of semiconductor laser 11.

The reflective surface 31A of the prism 31 gives phase difference α to the reflected light from the magneto-optical disk.

The half mirror surface 52A is coated with different coating than that of the reflective surface 31A, but the coating of the half mirror surface 52A is designed so as to give the same phase difference α, to the reflected light beam from the reflective surface 31A. Also, the incident plane of the prism 31 is perpendicular to the incident plane of half mirror surface 52A.

Therefore, the phase difference caused by the reflective surface 31A is canceled by the phase difference caused by the half mirror surface 52A.

Next, a concrete example of the coatings of the reflective surface 31A and the half mirror surface will be explained. Table 1 shows the construction of the coating of the half mirror surface 52A. Table 2 shows shows the construction of the coating of the reflective surface 31A. Reference "PCB" means base material under the coating.

TABLE 1

| Film number | material | thickness of a film (nm) |
| --- | --- | --- |
| 1 | $TiO_2$ | 98.1 |
| 2 | $MgF_2$ | 223.2 |
| 3 | $TiO_2$ | 98.1 |
| 4 | $MgF_2$ | 223.2 |
| 5 | $TiO_2$ | 98.1 |
| PCB | BK7 | |

TABLE 2

| Film number | material | thickness of a film (nm) |
| --- | --- | --- |
| PCB | Al | |
| 1 | ZrO$_2$ | 187.3 |
| 2 | MgF$_2$ | 164.5 |
| 3 | ZrO$_2$ | 103.1 |
| 4 | MgF$_2$ | 164.5 |
| 5 | ZrO$_2$ | 103.1 |
| 6 | MgF$_2$ | 164.5 |
| 7 | ZrO$_2$ | 103.1 |

In addition, the refractive index of TiO$_2$ is 1.38, the refractive index of ZrO$_2$ is 2.26 and the refractive index of MgF$_2$ is 2.02.

Figure 4:
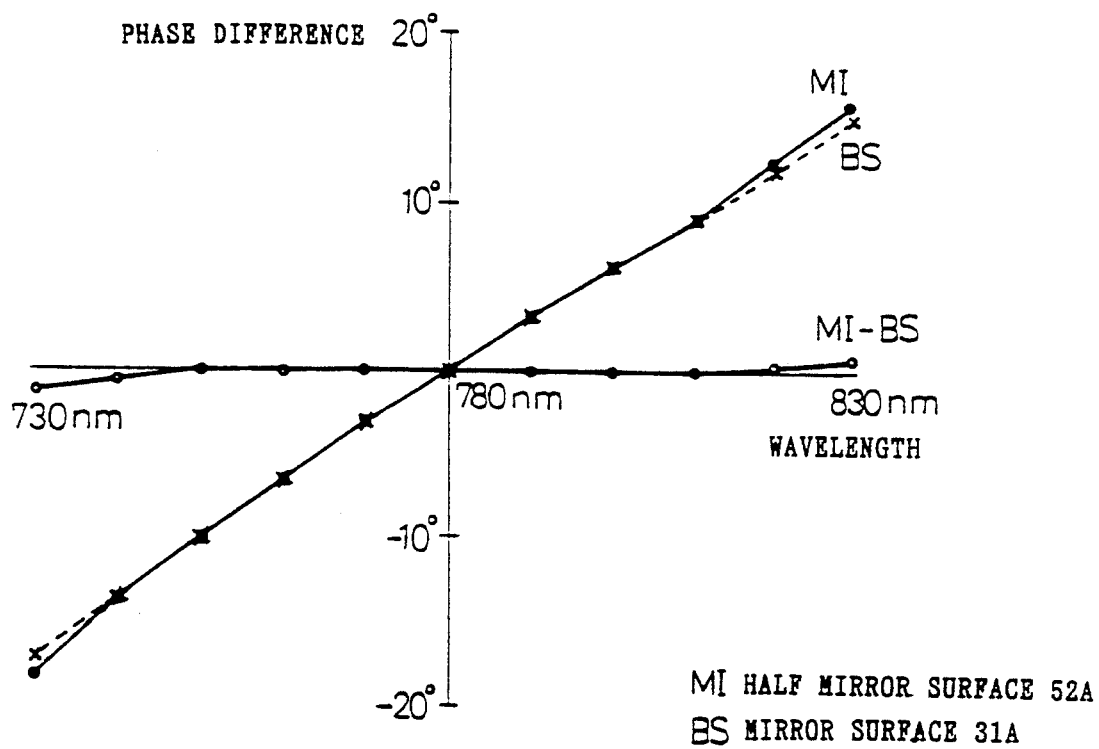
FIG. 4 is a graph showing the relation between the wavelength of an incident ray and the phase difference of a mirror and a beam splitter.

In FIG. 4, the solid line MI shows the phase difference of the mirror surface 31A, the broken line BS shows the phase difference of the half mirror surface 52A. By subtracting the phase differences MI and BS, the phase difference of a light beam reflected by both surfaces which is shown by the solid line MI-BS is settled in less than 1 degree in 780 nm±50 nm.

Moreover, when the optical characteristics is different between two reflective elements, such as the half mirror surface 52A and the reflective surface 31A, the phase difference of about 5 degrees is permitted in a magneto-optical disk apparatus within the range of 780 nm±20 nm.

In the prior art, non-phase difference coatings are required for the prisms 52 and 31. However, in the embodiment 2, the non-phase difference coatings are not required for the prisms 52 and 31.

It is nore difficult to provide the same phase difference for the half mirror surface 52A and the reflective surface 31A than to give the same phase difference for the same reflective surfaces such is the embodiment 1. But the coatings of the surfaces 52A and 31A is easier than the non-phase difference coating.

What is claimed is:

1. An optical system of a magneto-optical disk apparatus, comprising:
    a signal detecting system for detecting a recorded signal of a magneto-optic disk based on a polarized condition of a reflected light beam from said magneto-optic disk;
    an optical system for guiding said reflected light beam from said magneto-optic disk toward said signal detecting system, said optical system having at least one pair of first and second reflective elements, said first reflective element having a full reflective surface and said second reflective element having a half-mirror reflective surface;
    wherein said first reflective element reflects said reflected light from said magneto-optic disk and imparts a phase difference into said light beam, said second reflective element reflects said reflected light by said first reflective element toward said signal detecting system and imparts a phase difference which has the same magnitude as said phase difference caused by said first reflective element and an inverse sign.

2. An optical system of a magneto-optic disk apparatus according to claim 1, wherein an incident plane of said first reflective element is perpendicular to an incident plane of said second reflective element.

3. An optical system of a magneto-optic disk apparatus according to claim 1, wherein said first reflective element and said second reflective element are covered with different coatings.

4. An optical system of a magneto-optic disk apparatus, comprising:
    a signal detecting system for detecting a recorded signal of a magneto-optic disk based on a polarized condition of a reflected light beam from said magneto-optic disk; and
    an optical system for guiding said reflected light from said magneto-optic disk toward said signal detecting system, said optical system comprising at least one pair of first and second reflective elements which are designed so as to cancel the effect of phase difference with respect to each other, said first reflective element having a full reflective surface and said second reflective element having a half-mirror reflective surface.

5. An optical system of a magneto-optic disk apparatus according to claim 4, wherein said first reflective element and said second reflective element are covered with different coatings.

6. An optical system of a magneto-optic disk apparatus according to claim 4, wherein an incident plane of said first reflective element is perpendicular to an incident plane of said second reflective element.

* * * * *